(12) United States Patent
Uenohara et al.

(10) Patent No.: US 10,824,296 B2
(45) Date of Patent: Nov. 3, 2020

(54) CONFIGURING AN APPLICATION FOR LAUNCHING

(71) Applicant: International Business Machines Corporation, Armonk, NY (US)

(72) Inventors: Hayato Uenohara, Funabashi (JP); Akira Saito, Ichikawa (JP); Kazuhiro Konno, Ichikawa (JP); Yuhichi Takahashi, Zama (JP)

(73) Assignee: International Business Machines Corporation, Armonk, NY (US)

(*) Notice: Subject to any disclaimer, the term of this patent is extended or adjusted under 35 U.S.C. 154(b) by 7 days.

(21) Appl. No.: 16/108,609

(22) Filed: Aug. 22, 2018

(65) Prior Publication Data

US 2020/0064981 A1 Feb. 27, 2020

(51) Int. Cl.
*G06F 3/0481* (2013.01)
*G06F 3/0482* (2013.01)
(Continued)

(52) U.S. Cl.
CPC ....... *G06F 3/04817* (2013.01); *G01C 21/367* (2013.01); *G06F 3/016* (2013.01);
(Continued)

(58) Field of Classification Search
CPC .... G06F 3/04817; G06F 3/016; G06F 3/0482; G06F 3/0485; G06F 3/0486; G06F 3/04883; G06F 2203/04806; G01C 21/367
See application file for complete search history.

(56) References Cited

U.S. PATENT DOCUMENTS 9,285,955 B2\* 3/2016 Nezu ............... G06F 3/04883
9,710,826 B1\* 7/2017 Daniel ............ G06K 19/06037
(Continued)

FOREIGN PATENT DOCUMENTS

JP 2006309664 A 11/2006
WO 2013190802 A1 12/2013

OTHER PUBLICATIONS

Applion, "GPS Action Manager [Android]", http://applion.jp/android/app/jp.co.s_ing.android.gam, [retrieved May 7, 2018].
(Continued)

*Primary Examiner* — Stella Higgs
(74) *Attorney, Agent, or Firm* — North Shore Patents, P.C.; Joseph L. Acayan

(57) ABSTRACT

Embodiments generally relate to configuring an application for launching. In some embodiments, a method includes displaying on a display screen at least one application icon and a map. The method further includes receiving from a user a selection of the at least one application icon. The method further includes determining a placement region on the map to which the user can drag and drop the at least one application icon, wherein the determining of the placement region is based on a constraint condition. The method further includes indicating the placement region to the user as the user drags the at least one application icon onto the map. The method further includes enabling the user to drop the at least one application icon when the at least one application icon is over the placement region. The method further includes starting an application associated with the at least one application icon in response to the at least one application icon being dropped over the placement region and in response to a start condition being satisfied.

20 Claims, 10 Drawing Sheets

(51) Int. Cl.
*G06F 3/0486* (2013.01)
*G06F 3/0488* (2013.01)
*G06F 3/01* (2006.01)
*G01C 21/36* (2006.01)
*G06F 3/0485* (2013.01)

(52) U.S. Cl.
CPC .......... *G06F 3/0482* (2013.01); *G06F 3/0485* (2013.01); *G06F 3/0486* (2013.01); *G06F 3/04883* (2013.01); *G06F 2203/04806* (2013.01)

(56) References Cited

U.S. PATENT DOCUMENTS

| | | | | |
|---|---|---|---|---|
| 2004/0117109 | A1* | 6/2004 | Kodani | G01C 21/367 701/455 |
| 2007/0276597 | A1* | 11/2007 | Kato | G01C 21/367 701/431 |
| 2008/0077597 | A1* | 3/2008 | Butler | G06F 16/9537 |
| 2008/0098068 | A1* | 4/2008 | Ebata | H04L 51/00 709/206 |
| 2009/0122018 | A1* | 5/2009 | Vymenets | G06F 3/04817 345/173 |
| 2011/0316797 | A1* | 12/2011 | Johansson | G06F 3/04883 345/173 |
| 2012/0136503 | A1 | 5/2012 | Schunder | |
| 2012/0223890 | A1* | 9/2012 | Borovsky | G06F 3/0486 345/173 |
| 2014/0028716 | A1* | 1/2014 | Yeh | G06T 11/00 345/633 |
| 2014/0263649 | A1* | 9/2014 | Antognini | G06F 16/532 235/454 |
| 2014/0298253 | A1* | 10/2014 | Jin | G06F 3/04883 715/790 |
| 2015/0073701 | A1 | 3/2015 | Pierfelice | |
| 2015/0081659 | A1* | 3/2015 | Park | G06F 16/248 707/706 |
| 2015/0100597 | A1* | 4/2015 | Pastor | H04W 4/70 707/758 |
| 2015/0187100 | A1* | 7/2015 | Berry | G06Q 30/00 345/634 |
| 2015/0309689 | A1* | 10/2015 | Jin | G06F 3/04883 715/765 |
| 2016/0048320 | A1* | 2/2016 | Han | G06F 3/04883 715/765 |
| 2016/0062636 | A1* | 3/2016 | Jung | G06F 3/04817 715/762 |
| 2018/0232195 | A1* | 8/2018 | Jaegal | G06F 3/14 |
| 2018/0349413 | A1* | 12/2018 | Shelby | G06F 3/04815 |
| 2018/0365477 | A1* | 12/2018 | Seol | G06F 21/32 |
| 2019/0121482 | A1* | 4/2019 | Lee | G06F 3/0488 |

OTHER PUBLICATIONS

ASCII, "iOS Reminder", Kadokawa ASCII Research Laboratories, Inc., http://ascii.jp/elem/000/000/931/931956, 2018.
Lagace, Marc, "How to create a reminder on your iPhone and iPad", iMore, Sep. 2006.

* cited by examiner

CONFIGURING AN APPLICATION FOR LAUNCHING

BACKGROUND

Automotive navigation systems in recent years tend to include application programs, which are typically installed via a network. It is dangerous for a driver to manually launch an application while driving. While driving, it is also difficult for the driver to launch an application at a desired time (e.g., when arriving at a desired location, etc.). Existing applications do not provide a safe manner for a user to activate applications while driving.

SUMMARY

Disclosed herein is a method for configuring an application for launching, and a system and computer program product as specified in the independent claims. Embodiments are given in the dependent claims. Embodiments can be freely combined with each other if they are not mutually exclusive.

Embodiments generally relate to configuring an application for launching. In an embodiment, a method includes displaying on a display screen at least one application icon and a map. The method further includes receiving from a user a selection of the at least one application icon. The method further includes determining a placement region on the map to which the user can drag and drop the at least one application icon, wherein the determining of the placement region is based on a placement constraint condition. The method further includes indicating the placement region to the user as the user drags the at least one application icon onto the map. The method further includes enabling the user to drop the at least one application icon when the at least one application icon is over the placement region. The method further includes starting an application associated with the at least one application icon in response to the at least one application icon being dropped over the placement region and in response to a start condition being satisfied.

In another embodiment, the placement constraint condition is based at least in part on the application associated with the at least one application icon. In another aspect, the placement constraint condition is based at least in part on a predetermined distance from a route from a starting point to a destination point. In another aspect, the indicating of the placement region comprises highlighting one or more elements on the map. In another aspect, the indicating of the placement region comprises: generating one or more map elements on the map; and displaying the one or more map elements on the map, wherein the one or more map elements are positioned in the placement region. In another aspect, the indicating of the placement region comprises providing force feedback to the user. In another aspect, the at least one processor further performs operations comprising enabling the user to zoom in or zoom out with respect to the map based on a dragging gesture of an object.

DETAILED DESCRIPTION

Embodiments described herein are directed to configuring an application for launching. Embodiments provide a user interface for a user/driver, where the user interface facilitates settings for displaying an application icon and automatically starting/launching an application that is associated with the application icon. Embodiments automatically launch the application at a desired time and/or at desired conditions in conjunction with an automotive navigation system.

In some embodiments, a system displays on a display screen at least one application icon and a map. The system further receives from a user a selection of the at least one application icon. The system further determines a placement region on the map to which the user can drag and drop the at least one application icon based on a constraint condition. The system further indicates the placement region to the user as the user drags the at least one application icon onto the map. The system further enables the user to drop the at least one application icon when the at least one application icon is over the placement region. The system further starts an application associated with the at least one application icon in response to a start condition being satisfied.

Figure 1:
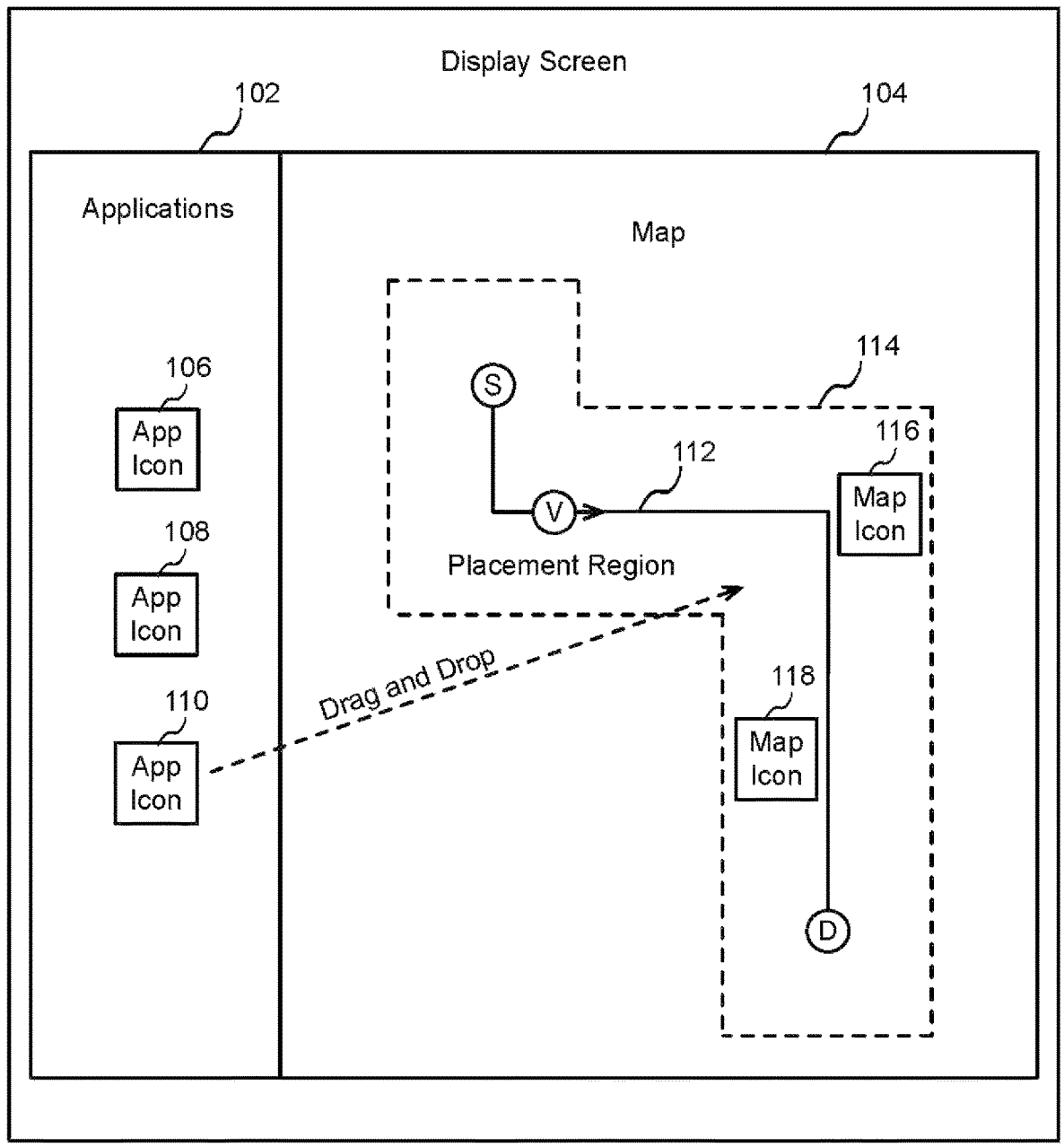
FIG. 1 is a display screen displaying an example user interface, according to some embodiments.

FIG. 1 is a display screen 100 displaying an example user interface, according to some embodiments. In various embodiments, display screen 100 (or navigation screen) is a touch screen of a navigation system. Shown are an applications region 102 and a map 104. Applications region 102 shows available applications that have been installed, where each application is represented by respective application icons 106, 108, and 110 (each labeled "App Icon"). While applications region 102 is shown on the left side of the user interface, applications region 102 may be located elsewhere (e.g., right side, top, bottom, etc.), depending on the particular implementation. Map 104 includes a route 112 from a start point (labeled "S") to a destination point (labeled "D"). Map 104 also includes a location of a vehicle (labeled "V") on route 112. Map 104 also includes a placement region 114, and map icons 116 and 118.

As described in more detail herein, the system enables a user to select, and then drag and drop an application icon such as application icon 110 from applications region 102 on to placement region 114 of map 104. The elements shown in FIG. 1 as well as system operations associated with such elements are described in more detail herein.

Figure 9:
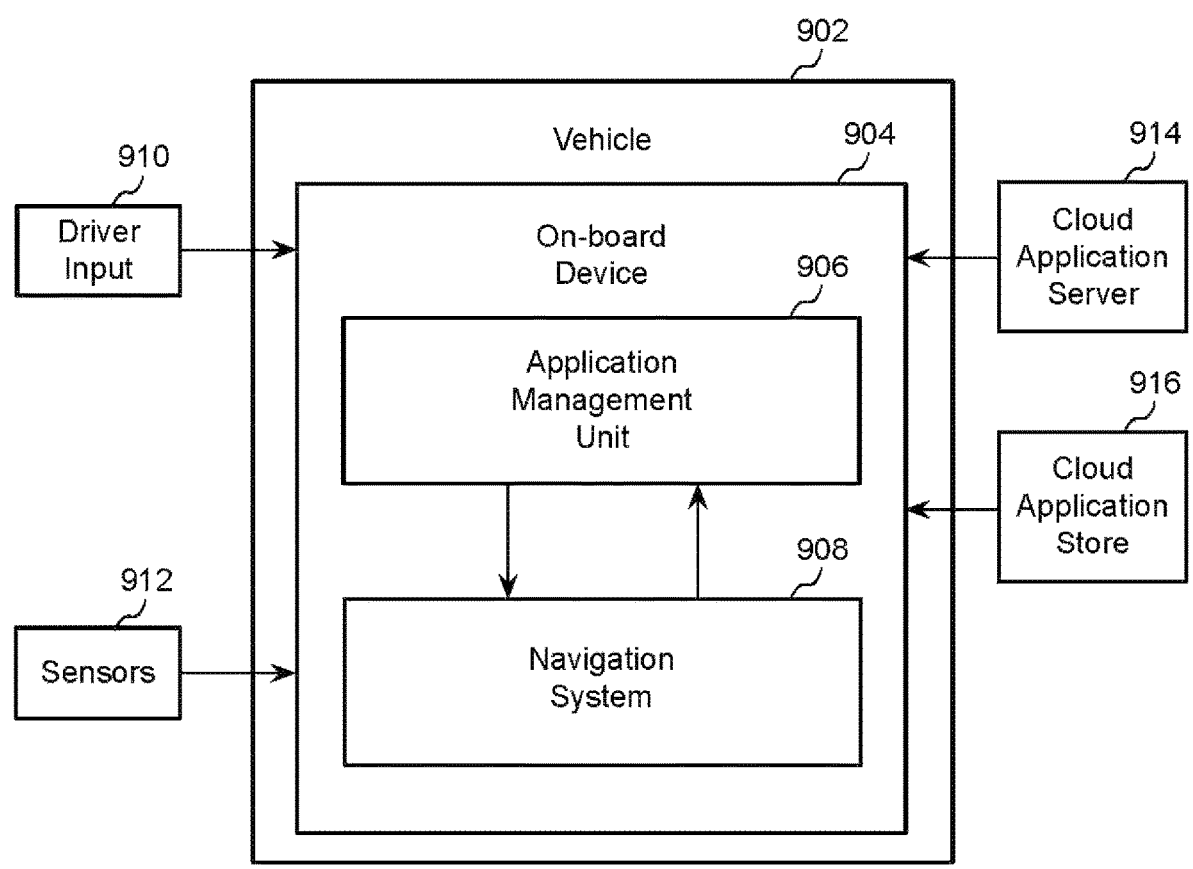
FIG. 9 is a block diagram of an example environment for configuring an application for automatic launching, which may be used for some implementations described herein.
Figure 10:
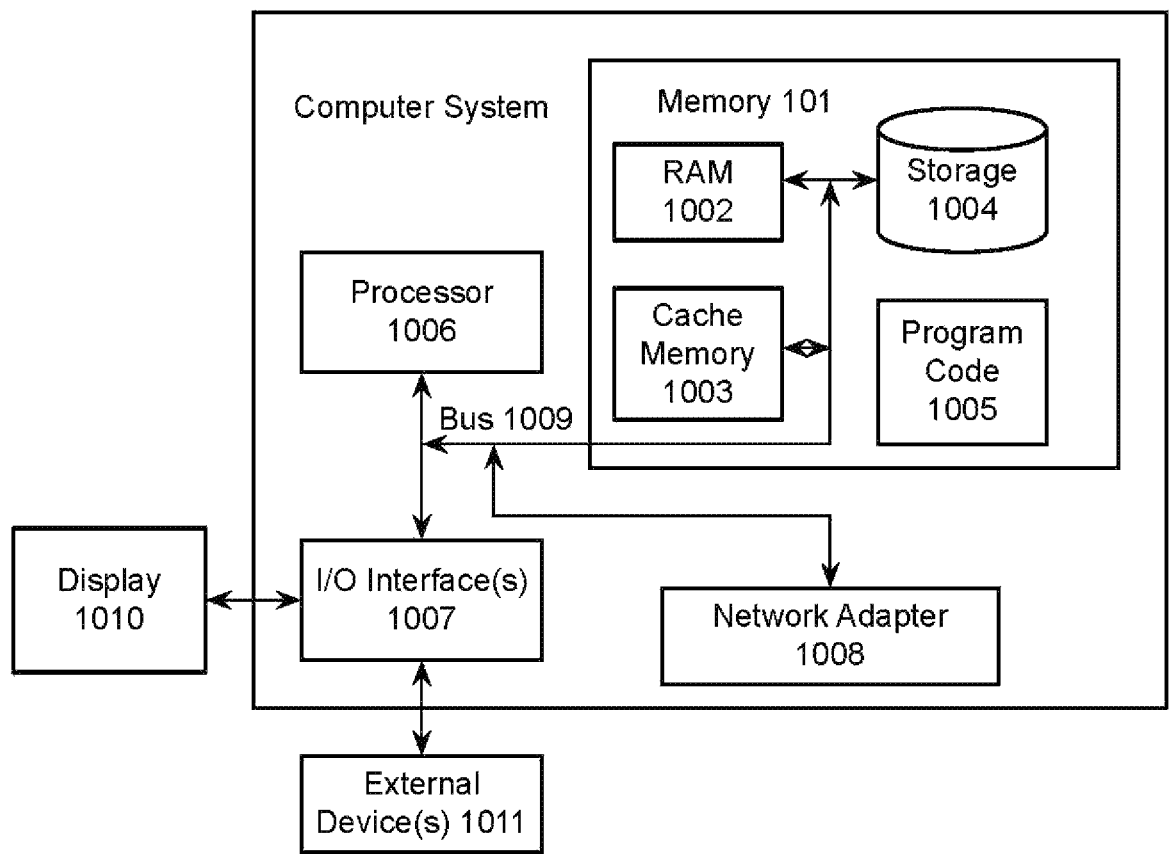
FIG. 10 is a block diagram of an example computer system, which may be used for embodiments described herein.

In various embodiments, a computer system such as on-board device 904 of FIG. 9 or computer system 1000 of FIG. 10 performs embodiments described herein. In other embodiments, any suitable component or combination of components associated with on-board device 904 or computer system 1000, or any suitable processor or processors associated with on-board device 904 or computer system 1000 may facilitate performing the embodiments described herein.

As described in more detail below in connection with FIG. 9, the system includes an application management unit and a navigation system for performing various embodiments described herein. The application management unit may include various sub-units such as an application execution processing unit for executing an application, an application icon display unit for displaying application icons, a placement range providing unit for providing a placement range, an application automatic start setting unit for configuring an application for automatic launching, an application automatic start processing unit for automatically launching an application, and a navigation search proxy unit for various navigation functions. Application management unit 906 may also include various databases such as an application database, an automatic start setting database, etc. The navigation system may include a map screen control unit for rendering maps and map elements in a display screen and includes a route management unit for managing routes to be displayed in the display screen.

Figure 2:
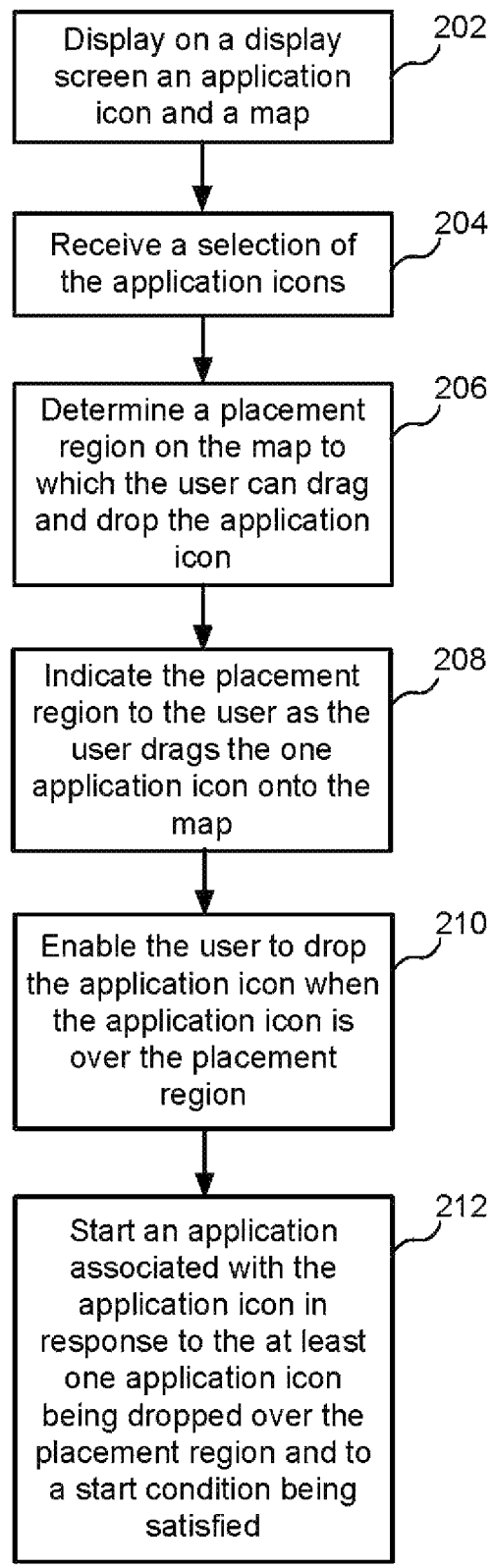
FIG. 2 is an example flow diagram for configuring an application for automatic launching, according to some embodiments.

FIG. 2 is an example flow diagram for configuring an application for automatic launching, according to some embodiments. As described in more detail herein, the system automatically, without user intervention, launches one or more applications while a user/driver operates a vehicle. Referring to both FIGS. 1 and 2, a method begins at block 202, where a system such as on-board device 904 of FIG. 9 or computer system 1000 of FIG. 10 displays on display screen 100 one or more application icons 106, 108, and 110, and displays a map 104. For ease of illustration, three application icons 106, 108, and 110 are shown. The particular number of available application icons may vary, depending on the implementation.

At block 204, the system receives from a user a selection of one of the application icons, such as application icon 110. For example, to select application icon 110, the system enables the user to click on application icon 110.

At block 206, the system determines placement region 114 on map 104 to which the user can drag and drop one or more of the application icons based on a placement constraint condition. In various embodiments, the placement constraint condition is based at least in part on the application associated with the application icon that was selected by the user. In various embodiments, the placement constraint condition is based at least in part on a predetermined distance from a route from a starting point to a destination point. In various embodiments, the placement constraint condition is based at least in part on a predetermined distance from a predetermined type of business (e.g., a drive-through restaurant, etc.). There may be one or more placement constraint conditions, and the particular placement constraint conditions used will depend on the particular implementation. Embodiments involving constraint conditions and further examples are described in more detail herein.

At block 208, the system indicates placement region 114 to the user as the user drags an application icon onto the map. In various embodiments, to indicate the placement region, the system highlights one or more elements on the map, such as map icons 116 and 118. In various embodiments, to indicate the placement region, the system generates one or more map elements on the map, such as map icons 116 and 118. Map icons may represent various locations in the map such as business (e.g., restaurants, gas stations, etc.). The system then displays the one or more map elements on the map. In various embodiments, the one or more map elements are positioned in placement region 114. In some embodiments, the range in which the map icons are to be placed is displayed on map 104 while the remaining icons and ranges are grayed out. In various embodiments, to indicate the placement region, the system provides force feedback to the user. For example, force feedback may include a vibration on the screen when the finger of the user is in the placement region. This indicates to the user that the application icon is in the placement region. Embodiments involving placement regions and further examples are described in more detail herein.

At block 210, the system enables the user to drop an application icon (e.g., application icon 110) when it is hovering over placement region 114. In some embodiments, the system places and displays the application icons based on a confirmation operation such as the user releasing (dropping) the application icon. For example, if the application icon is hovering over the placement region and the user releases the application icon, the system displays the application icon where the user released it. Otherwise, if the application icon is not hovering over the placement region and the user releases the application icon, the system may indicate to the user that dropping the application icon is not permissible. In such a scenario, the system may automatically move the application icon back to the applications region, or may automatically move the application icon to the placement region.

At block 212, the system starts an application associated with the dropped application icon (e.g., application icon 110) in response to the at least one application icon being dropped over the placement region and in response to a start condition being satisfied. For example, if the start condition is based on a specified location such as a specified position on the route being reached, the system automatically launches the corresponding application. As a result, embodiments automatically launch the application at a desired time and/or at desired conditions. In some embodiments, the specified position may be where the user drops the application icon in placement region 114.

In various embodiments, the start condition includes a first condition and a second condition. For example, the first condition may require that the user/driver reach a predetermined range from a placement position of the application icon. The second condition may be based at least in part on one or more of time, a vehicle speed, a lane, fuel remaining, weather, and a state of a driver or a passenger (e.g., if the system could detect drowsiness of the driver from swerving, etc.), etc.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

The following are examples of applications to be arranged on the map and their start conditions. A first example is an application program for capturing a photo using an on-board camera. In this example scenario, an application icon is placed at a selected location (e.g. a photo spot, etc.) on the map where one can enjoy a scenic view or where one may want to stop to look at a view, take a picture of an accident, etc. In some embodiments, the system may activate the application as the automobile approaches the location that has been specified to allow the capturing operation. The start condition may include not activating the application in bad weather or during night-time hours, because one would not be able to capture the views he or she wants to see.

Another example is an application program for drive-thru services of fast-food restaurants, where an application enables indication of a drive-thru menu and reception of coupons. The system enables the user to place an application icon for a fast-food restaurant on a commute route on the map. The start condition may include activating the application only during breakfast service hours, etc.

Another example is a gas station application. An application may enable reception of price information and coupons. The system enables the user to place an application icon at frequently used gas stations on the map. The start condition may include activating the application when the amount of fuel remaining becomes lower than a predefined level (e.g., 5 gallons, 10 gallons, etc.). Another start condition may include activating the application when it is determined that the fuel is not sufficient for reaching the destination taking into account the remaining distance of current set route in the navigation system, gas mileage information, the amount of fuel remaining, etc.

Another example is a shopping list application. For example, a shopping list application may provide a reminder when approaching a shop that appears in the shopping list (shared in a cloud-based manner by smartphones, etc.) or a shop that sells the items appearing in the shopping list.

The system activates the application when the automobile approaches the store at which the corresponding icon is placed on the map to provide a reminder along with the shopping information. The start condition may include activating the application when returning home at a shop where the desired item is in stock during the store open hours (e.g., when the user may have more flexible time, etc.). The start condition may include not activating the application on the way to the destination (e.g., when the user may be on route to work and might not have flexible time, etc.).

When multiple items are available, the system may propose the most appropriate store from among the stores by which the application icons are placed on the map. For example, the store where the user can get all the items on the shopping list at once may be preferentially selected.

The following examples are directed to further embodiments. In one example embodiment, an application may be distributed (installed) at the time of the automatic execution and uninstalled at the completion. This is useful, for example, in a scenario where the route setting is specified such that the route setting is transmitted to vehicles of others (e.g., a rental car, taxi, etc.). The end condition may also be specified. In some embodiments, an end condition may be the reverse of the start condition. For example, if the start condition no longer is met, the system ends the application. In another example, in a photo application, an end condition may be when the user leaves a location after taking a photo, or when photo conditions are no longer met (e.g., weather, air clarity, lighting, etc.).

In another example embodiment, sophisticated sensing analytics on data gathered inside or outside of the vehicle may be carried out to specify various start conditions. For example, "child sleeping," or a "wakefulness level of the driver" may be analyzed from an in-vehicle camera and/or environmental sensors (vibration, temperature, humidity, etc.). In some embodiments, the wakefulness level of the driver may be determined by detection of the vehicle swerving or drifting. In some embodiments, a state analyzed from the information obtained from the Internet or an intelligent transportation system (ITS) (optical beacon, street camera, etc.) may be defined as the start condition. In another example embodiment, the placement range may be enlarged to facilitate finely tuned placement.

Figure 3:
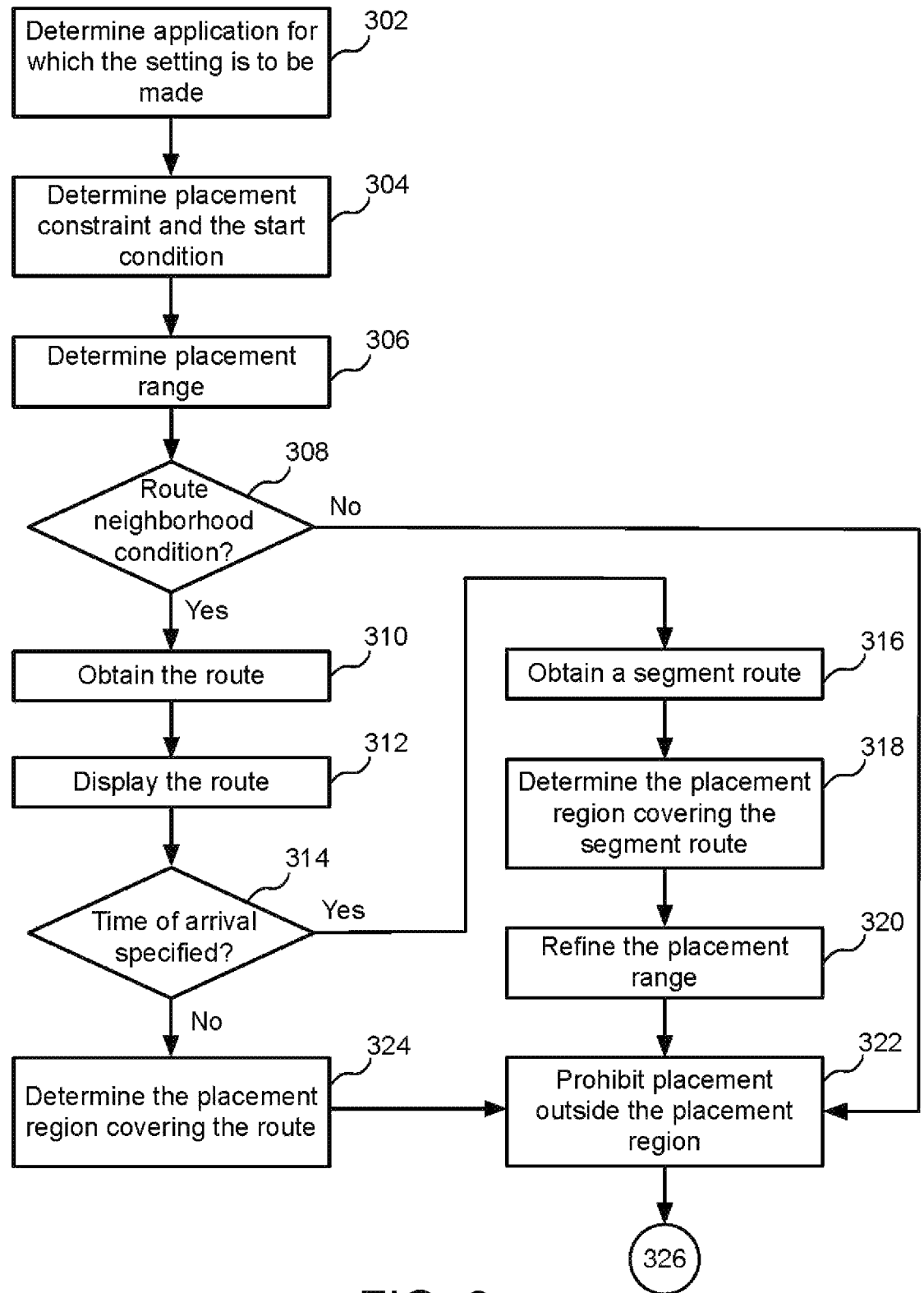
FIGS. 3 and 4 illustrate an example flow diagram for application placement in a map, according to some embodiments.
Figure 4:
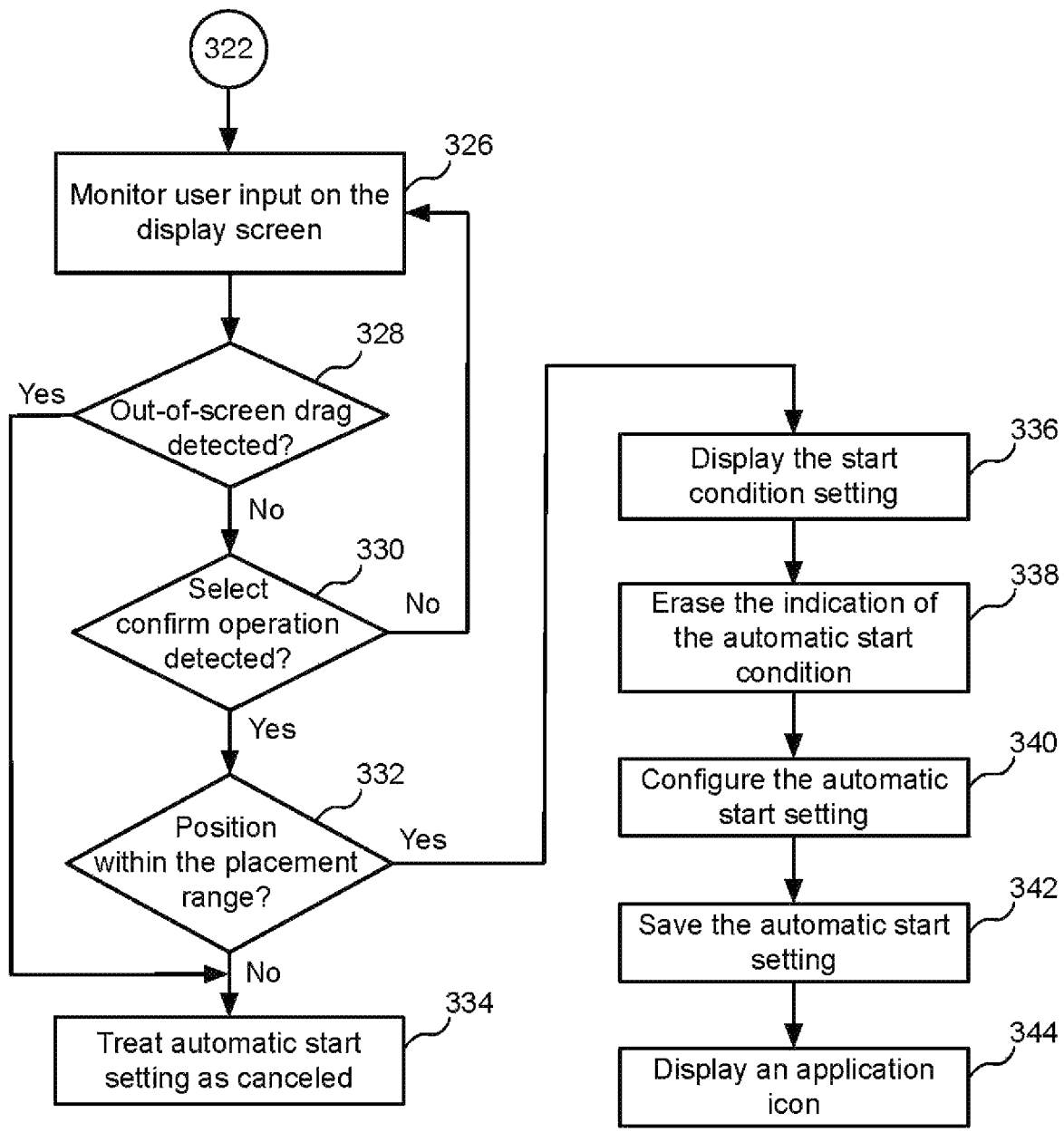

FIGS. 3 and 4 illustrate an example flow diagram for application placement in a map, according to some embodiments. FIG. 3 illustrates the first portion of the example flow diagram, and FIG. 4 illustrates the second/remaining portion of the example flow diagram. As described in more detail herein, the system sets a processing procedure, which includes specifying a placement constraint condition and a start condition. Referring to both FIGS. 1 and 3, a method begins at block 302, where the system determines the application for which the setting of a placement constraint and a start condition is to be made. In some embodiments, the application icon display control unit of the system determines the application for which the setting is to be made. This determination is made in response to operation by the user. For example, using the input operation by the user on the application icon (e.g., a drag start operation) as the trigger, the application icon display control unit sends a notification to the application automatic start setting processing unit of the system.

In block 304, the system determines a placement constraint and a start condition for the application. In some embodiments, the application automatic start setting processing unit of the system reads the placement constraint condition and the start condition from the application database. In various embodiments, the placement constraint condition and the start condition is based on the application information of the application that has been selected, information on the corresponding application placement constraint condition and the corresponding start condition from the application database. The information may be downloaded and read from an application store instead of reading it from the application database. In various embodiments, applications are installed in the application database from which the placement constraint condition and the start condition associated with the package of the application may be obtained.

The following is an example of the placement constraint condition (feasible range setting). If the route is specified, the placement constraint condition may be that the application icon may be placed on the route or near the route (at a predetermine distance). If the route is not specified, the system may extract locations where the driver is likely to go in view of the driving history, etc. until reaching a destination. An example of a placement constraint condition may include that the application icon may be placed at or by a drive-thru store, school zone, a particular business or location, etc.

In block 306, the system determines a placement range based on the placement constraint condition. In some embodiments, the application automatic start setting processing unit of the system causes the application placement range providing unit of the system to process the placement constraint condition. The application automatic start setting processing unit also obtains the placement range and the route neighborhood condition. The route neighborhood condition is optionally obtained. For example, if the constraint condition indicates a particular region, the indicated region may be defined as the placement range. Also, if the constraint condition indicates a particular point, the region near the point may be determined as the placement range.

In block 308, the system determines if there is a route neighborhood condition. If yes, the system proceeds to block 310. If not, the system proceeds to block 322, described below. In various embodiments, a route neighborhood condition is a type of placement constraint condition that relates to the route. A route neighborhood condition may be specified in addition to the placement range condition in order to narrow down the placement range. For example, in the shopping list application example, the system may specify a route neighborhood condition to disregard shops that are far from the current route to the user's ultimate destination (e.g., home, etc.). This would help to prevent the user from straying too far from the route. The system may also specify the arrival time for each shop in order to minimize delays in the user arriving to the ultimate destination.

In some embodiments, the application automatic start setting processing unit of the system delivers the application placement range and the route neighborhood condition to the map screen control unit and issues a display request thereto.

In block 310, if the route neighborhood condition exists, the system obtains the route specified by a route management unit of the system. In some embodiments, the map screen control unit of the system obtains the specified route. In some embodiments, the map screen control unit extracts several locations as the destination candidates from the driving history, etc., and obtains the route leading there from the route management unit.

In some embodiments, the system obtains the route leading to these locations by sending a query to the route management unit. When the time of arrival is specified in the route neighborhood condition, the segment route extending as far as the point that can be reached by the specified time on the route is queried to the route management unit, and thus obtained.

In block 312, the system displays the route. In some embodiments, if the route neighborhood condition exists, the map screen control unit draws/displays the route on the map.

In block 314, the system determines that if a time of arrival is specified in the route neighborhood condition, the system obtains the segment route obtained in the preceding stage. If yes, the system proceeds to block 316. If no, the system proceeds to block 324, described below.

In block 316, if the time of arrival is specified, the system obtains a segment route. In some embodiments, the map screen control unit of the system obtains a segment route from the route management unit of the system. The some embodiments, the segment route leads to the point on the route that can be reached by the specified time. The segment route is used to refine the placement range, described below.

In block 318, the system determines the placement region covering the segment route. In some embodiments, the map screen control unit of the system determines the placement region covering the segment route, covering the area around the segment route from the range specified in the route neighborhood condition.

In block 320, the system refines the placement range. In some embodiments, the map screen control unit of the system refines the placement range, narrowing it down to a range contained in the placement region.

In block 322, the system prohibits placement of an application icon outside the placement region. In some embodiments, the map screen control unit of the system performs necessary control steps such as graying out the regions other than the application placement range A to prohibit them from being selected. The map screen control unit carries out control functions such as making regions other than the application placement range grayed out so as to be prohibited from selection.

In some embodiments, the system may utilize a force-sensing device (e.g., haptic feedback, etc.). The force-sensing feedback may be generated according to the constraint condition (e.g., a haptic guidance that causes an object to be guided to be absorbed into the candidate placement range). The system then proceeds to block 326 of FIG. 4.

In block 324, if there is no specified time of arrival to a final destination (e.g., appointment, start time at work, etc., the system determines the placement region covering the route. The placement region corresponds to the range around the route that is specified by the constraint condition. In some embodiments, the map screen control unit of the system determines the placement region covering the route, covering the area around the route from the range specified in the route neighborhood condition. The system then proceeds to block 322, where the system prohibits placement of an application icon outside the placement region.

FIG. 4 illustrates the second/remaining portion of the example flow diagram continuing from FIG. 3, according to some embodiments. Referring to both FIGS. 1 and 4, at block 326, the system monitors the user input on the display screen. In some embodiments, the map screen control unit of the system monitors the user's input operation on the map.

In block 328, the system determines if an out-of-screen drag is detected. If no, the system proceeds to block 330. If yes, the system proceeds to block 334. In some embodiments, upon detection of the selection confirmation operation (e.g., release operation, pressing of the haptic device, etc.), the map screen control unit determines whether or not the operation position resides within the application placement range.

In block 330, the system determines if a select confirm operation is detected. If no, the system proceeds to block 326. If yes, the system proceeds to block 332. The application icon display control unit detects the confirmation operation and causes the indication of the operation on the application icon to disappear.

In block 332, the system determines if the operation position is within the placement range. If it resides within the range, the map screen control unit determines the operation position as the placement position and sends a notification to the application automatic start setting processing unit.

In block 334, the system treats the automatic start setting as cancelled. When the confirmation operation has been detected out of the selection feasible range, or when having detected the fact that the application icon has been dragged to the outside of the screen before the confirmation operation, then the operation at issue may be regarded as having been cancelled.

While the input operation is being made, control is performed such as highlighting the map icons and the regions near the route depending on whether the operation position resides within or outside of the placement range, and activating haptic feedback (absorption, ejection, vibration, etc.) in the case of the haptic device.

In some embodiments, the system may detect a multiple selection operation (e.g., causing options to be displayed and selected) after the confirmation operation. The system may repeat the above-described steps such that the same applications are arranged at multiple locations.

In block 336, the system displays the start condition setting. In some embodiments, the map screen control unit of the system draws the start condition setting on the map screen and accepts the input of the start condition that can be specified by the user. The application automatic start setting processing unit of the system requests the map screen control unit to display the start condition setting.

In some embodiments, the application automatic start setting processing unit of the system starts the processing of the start condition setting. This processing is in response to the notification about the placement setting position. The application automatic start setting processing unit adds the start condition setting and the conditions. The application automatic start setting processing unit then delivers the application information to the map screen control unit. The application automatic start setting processing unit then issues a display request to display the start condition that has been specified.

The following is an example of start conditions: while the "reaching placement position" serves as the basic condition, secondary conditions may be specified such as "on the way home," "lane," "vehicle speed," "fuel remaining," "weather," "straying from route," "intersection just one before the specified position," "stopping at red light," "running," "destination is your home," and "child sleeping" (assuming that a dedicated human sensor is provided). The same unit may add a start condition related to the placement position and automatically specify a system-wide start condition (preloaded conditions based on safety regulations, etc.).

In block 338, the system erases the indication of the automatic start condition. In some embodiments, upon detection of completion of the input, the map screen control unit of the system erases the indication of the automatic start condition. The map screen control unit also returns the start condition setting that has been confirmed to the application automatic start setting processing unit.

In some embodiments, the map screen control unit causes the automatic start condition setting to be presented on the map screen and accepts inputs by the user. When completion of the input has been detected, the map screen control unit erases the indication of the automatic start condition setting and returns the consequential input result thus obtained (the start condition setting that has been confirmed) to the application automatic start setting processing unit.

In block 340, the system configures the automatic start setting. In some embodiments, the application automatic start setting processing unit of the system configures the automatic start setting based on the placement setting position and the start condition.

In block 342, the system saves the automatic start setting in the automatic start setting database. In some embodiments, the application automatic start setting processing unit of the system saves the automatic start setting in the automatic start setting database. In some embodiments, the application automatic start setting processing unit configures the automatic start setting based on the placement setting position and the start condition that has been specified. The application automatic start setting processing unit stores the setting that has been configured in the automatic start setting data.

In block 344, the system displays an application icon. In some embodiments, the map screen control unit of the system displays the application icon at the placement setting position of the corresponding application.

In some embodiments, the application automatic start setting processing unit sends notification about the addition of the automatic start setting to the application automatic start processing unit of the system. The application automatic start setting processing unit delivers the information on the application and the placement setting position to the map screen control unit. The application automatic start setting processing unit issues a display request to display the application icon and the like at the placement setting position. The map screen control unit updates the display screen upon receipt of the request.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 5:
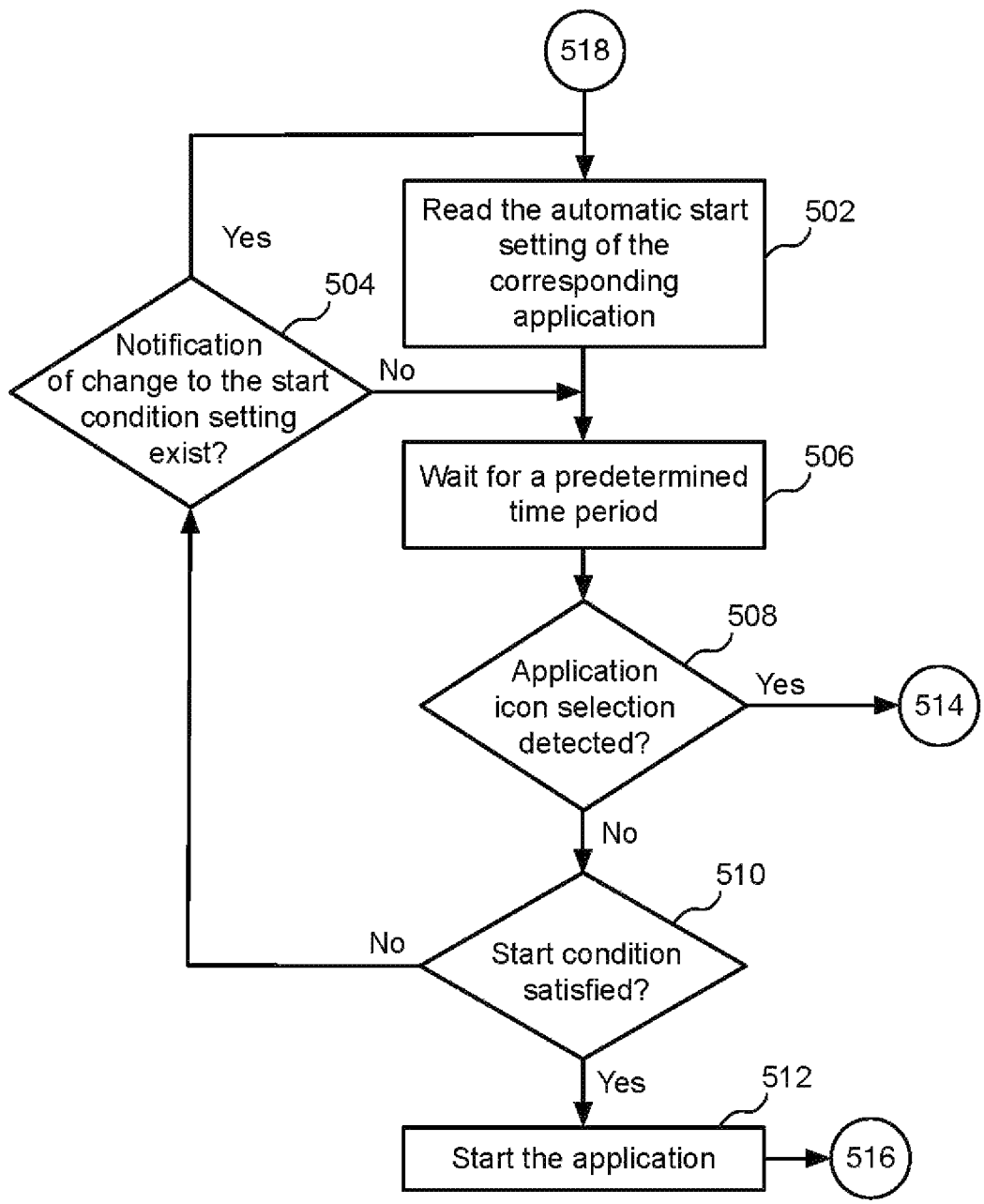
FIGS. 5 and 6 illustrate an example flow diagram for automatically starting an application, according to some embodiments.
Figure 6:
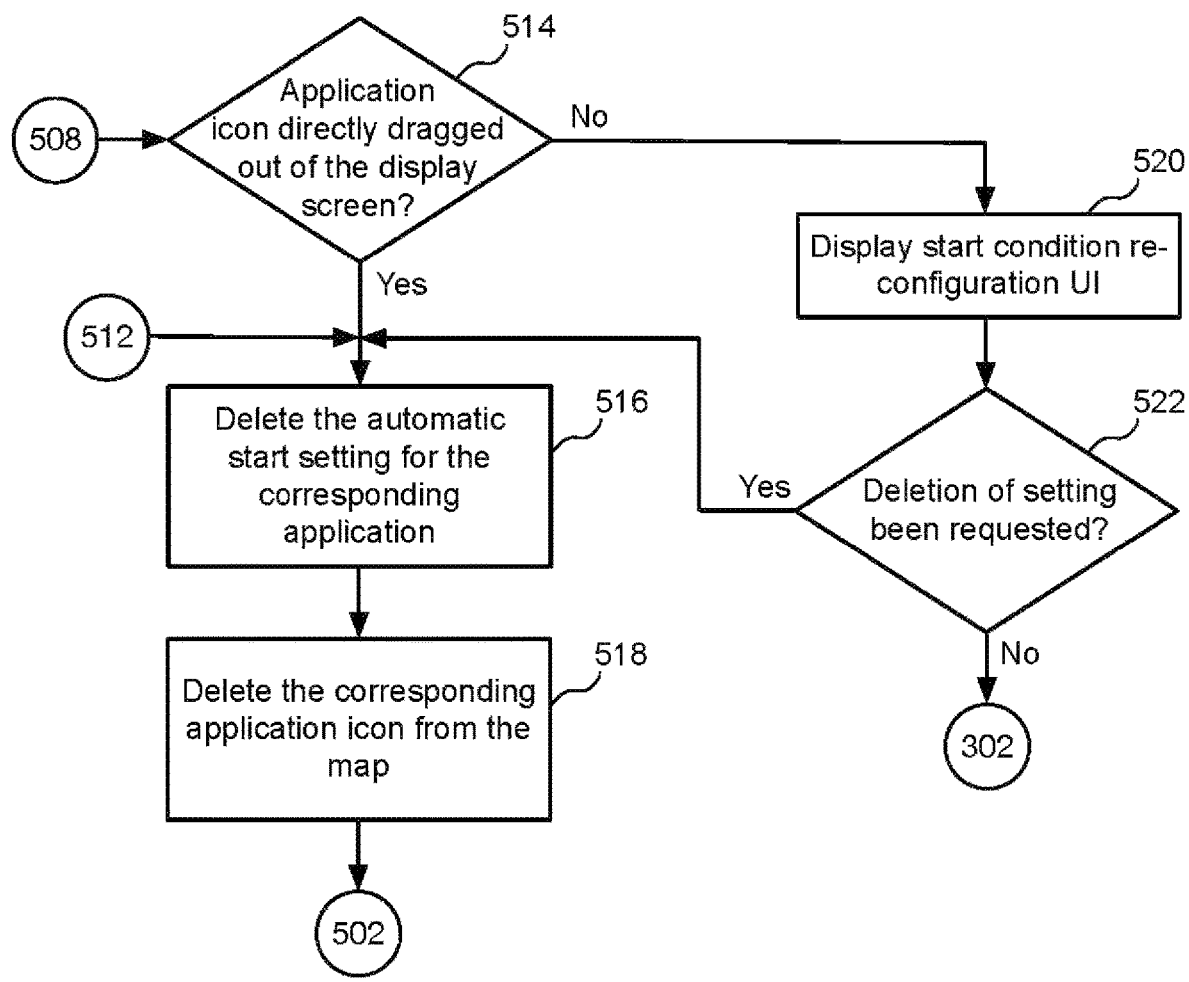

FIGS. 5 and 6 illustrate an example flow diagram for automatically starting an application, according to some embodiments. FIG. 5 illustrates the first portion of the example flow diagram, and FIG. 6 illustrates the second/remaining portion of the example flow diagram. Note that the flow repeats while the system is running. For example, the system starts at block 502. After the system completes block 518 at the end of the flow, the system continues to block 502.

As described in more detail herein, the system automatically starts an application, as well as modifies and/or deletes an automatic start setting for the application. Referring to both FIGS. 1 and 5, a method begins at block 502, where the system reads the automatic start setting of the corresponding application. In some embodiments, the application automatic start processing unit reads the automatic start setting of the corresponding application from the automatic start setting database.

In block 504, the system determines if a notification of change to the start condition setting exists. If yes, the system proceeds to block 502. If no, the system proceeds to block 506. In some embodiments, when the system is started or when the notification (e.g., setting addition/modification, setting deletion, etc.) has been received, the application automatic start setting processing unit of the system reads the application automatic start setting from the automatic start setting database.

In block 506, the system waits for a predetermined time period.

In block 508, the system determines if the application icon selection is detected. The system checks to determine whether a user/driver clicked on the application icon for reconfiguration or deletion. If yes, the system proceeds to block 514. If no, the system proceeds to block 510. In various embodiments, the system also ensures that an automatic start setting is specified.

In some embodiments, the map screen control unit of the system monitors the user's input operation on the map screen. Upon detection of a selection operation selecting an application icon, the map screen control unit determines that it is the reconfigure operation for reconfiguring the start condition. The map screen control unit then sends a notification to the application automatic start setting processing unit of the system.

The application automatic start setting processing unit of the system causes the map screen control unit to display the setting user interface. The setting user interface enables the start condition to be updated, and accepts the reconfiguration of the start condition (configuration change) or deletion of automatic start setting by the user input for the corresponding application.

In block 510, the system determines if the start condition is satisfied. If yes, the system proceeds to block 512. If no, the system proceeds to block 504. In some embodiments, the application automatic start processing unit periodically obtains the current position (location) and the information necessary for determination of the start condition from in-vehicle sensors. The application automatic start processing unit then compares them with the application start condition. If there is any application for which the start condition has been satisfied, it sends a notification to the application execution processing unit and starts the eligible app.

In block 512, the system starts/launches the application. The application execution processing unit starts the app.

FIG. 6 illustrates the second/remaining portion of the example flow diagram continuing from FIG. 5, according to some embodiments.

In block 514, the system determines if the application icon has been directly dragged out of the display screen. If yes, the system proceeds to block 516. If no, the system proceeds to block 520. In some embodiments, the map screen control unit sends a notification to the application automatic start setting processing unit of the system to delete the automatic start setting.

In block 516, the system deletes the automatic start setting for the corresponding application. In some embodiments, the application automatic start setting processing unit of the system deletes the automatic start setting for the corresponding application from the automatic start setting database. The application automatic start setting processing unit also sends a notification about the change to the application automatic start processing unit. The application automatic start processing unit of the system then deletes the automatic start setting for the corresponding application.

In some embodiments, the map screen control unit determines that it is a setting deletion operation by the driver when having detected that the application icon has been dragged to the outside of the screen. The map screen control unit then sends a notification to the application automatic start setting processing unit to delete the automatic start setting of the corresponding application.

The map screen control unit may display the user interface for specifying the automatic deletion setting, so as to delete or invalidate the automatic start setting. The following is an example of a deletion setting: "Only once," "repeat," "invalidate for a certain period," "only once on this route," "once a day," etc.

In some embodiments, a screen for displaying the list of the currently specified application automatic start settings may be provided, and the list is presented to the user in response to the operation of this step so as to modify or delete the setting selected from the list.

In block 518, the system deletes the corresponding application icon from the map. In some embodiments, the map display control unit deletes the corresponding application icon from the map. The map screen control unit sends a notification to the application automatic start setting processing unit about re-configuration of the start condition. The system then proceeds to block 502.

In block 520, if the system determines that an application icon was not directly dragged out of the display screen, the system displays start condition re-configuration user interface (UI). In some embodiments, the application automatic start setting processing unit makes the map screen control unit present the start condition re-configuration user interface to the driver and accepts the reconfiguration/deletion of the start condition and erases the setting user interface upon completion of the setting.

In block 522, the system determines if a deletion of a setting has been requested. If yes, the system proceeds to block 516. If no, the system proceeds to block 302 of FIG. 3.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

The following are example embodiments directed to constraint conditions for application placement. In some embodiments, a file describing a constraint condition on the placement of an application program comes with a package of the application (e.g., included in a jar file of the application) or may be available at an application store to be accessible from the application management unit.

Figure 7:
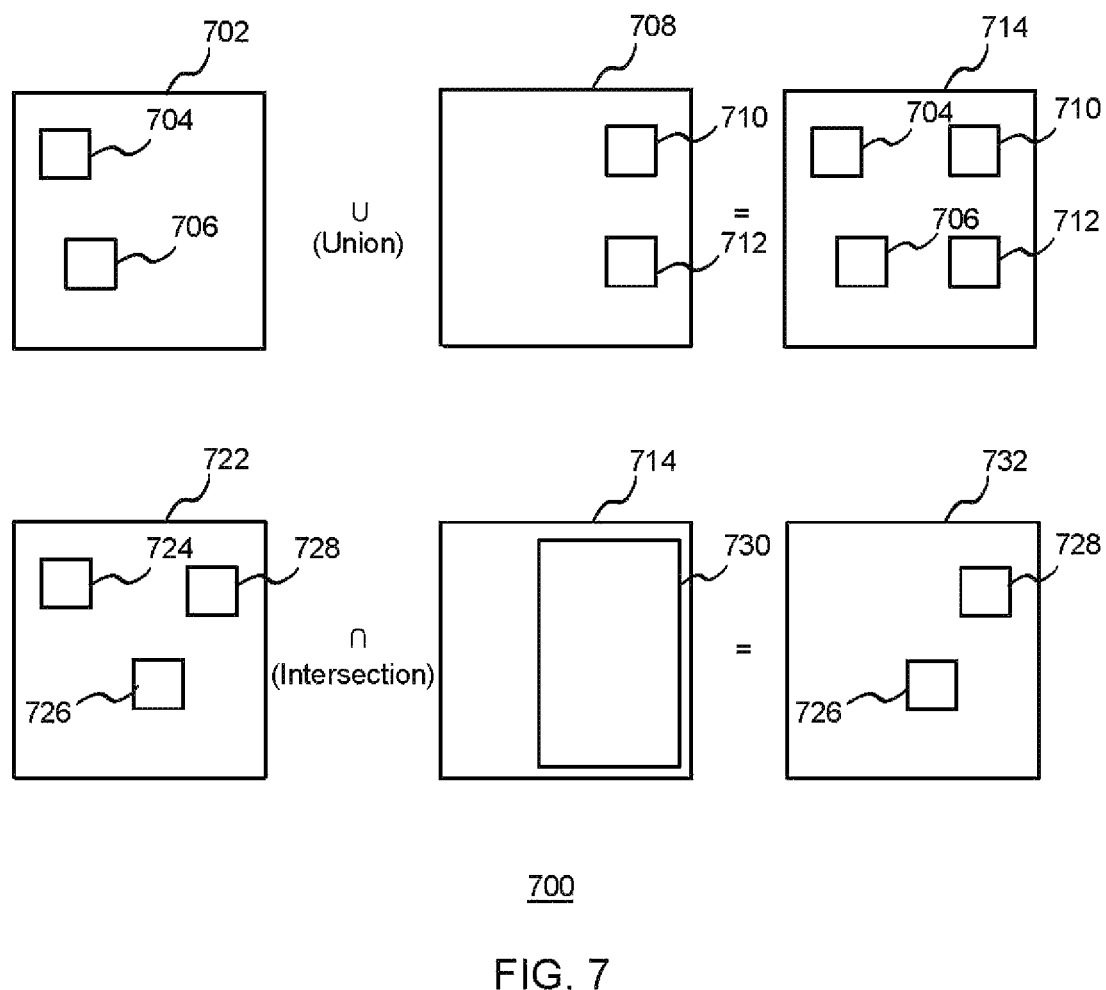
FIG. 7 illustrates example operations for range definition, according to some embodiments.

FIG. 7 illustrates example operations for range definition, according to some embodiments. In a union operation example, shown is a map 702 having map elements 704 and 706, and a map 708 having map elements 710 and 712. In some embodiments the system determines a union between the map elements, which results in a map 714 having map elements 704, 706, 710, and 712. In some embodiments, the map elements may represent restaurants, for example. The system may apply constraints based on the restaurant locations. The system may use the union operation to specify multiple restaurant search engines, and create a composed placement range constraint that contains all of the results from those engines. More specifically, for example, a first search engine may return search results with map elements 704 and 706, and a second engine may returns search results with map elements 710 and 712. In this example, the system will contain both as the placement range constraint. As such, the system applies the union operation to obtain search results containing map elements 704, 706, 710, and 712. The particular type of business may vary, depending on the particular implementation. An applications for restaurants is one example. Others are possible (e.g. gas stations, shops, etc.), including combinations of different types of businesses.

In an intersection operation example, shown is a map 722 having map elements 724, 726, and 728. Also shown is a map 714 having a map element 730. In some embodiments the system determines an intersection between the map elements, which results in a map 732 having map elements 726 and 728. In some embodiments, the system may use the intersection operation to add another constraint in order to narrow down the results. For example, the system may specify some demographic and/or geographic filters such as "business area," "school zone," "parking free zone," etc. The system may use the intersection operation to find restaurants within those areas. For example, map elements 724, 726, and 728 may be restaurants, and map element 730 may be a business area. Taking the intersection of these map elements would result in the constraint "restaurants within map element (business area) 730," which would result in map elements (restaurants) 726 and 728, as shown.

In some embodiments, the application placement range providing unit uses as the input the file describing the application placement constraint condition, and as the outputs the application placement range and the route neighborhood condition. In some embodiments, the placement range may be based on a set of rectangular, circular, and/or polygonal ranges indicated by the latitude and longitude on the map. The map screen control unit makes the respective ranges correspond to the locations on the display screen.

In some embodiments, the placement constraint condition describes calculation of multiple range definitions and a route neighborhood condition. The range definition defines one or more rectangles, circles, polygons, etc. on the map. The calculation of the range definition comprises computation of a sum of the ranges and computation of the common part. When a point is simply specified, a rectangle (or circle or polygon) with a predetermined range enclosing this point is defined. The range definition may be made using a description that calls other services.

In some embodiments, the distance from the route and the time of arrival may be specified as the route neighborhood condition. The system may determine the distance by making requests to the navigation system. For example, the system may make a request may be for a search to the navigation system (which is made via the navigation search proxy unit). The system may make a request for a search to the application server on the Internet by a representational state transfer (REST) application programming interface (API), which may be made available via the web search proxy unit).

In some embodiments, start conditions may be specified for the apps whose icons are placed. In some embodiments, a start condition may be specified in association with the status inside or outside of the automobile that can be obtained from a vehicle sensor, a navigation system, or the Internet. For example, the condition may be specified as a combination of status including "vehicle speed," "lane number," "fuel remaining," "mileage," "time period," "returning home (e.g., the destination is the user's home)," "weather," "state of driver/passenger," etc., with the basic condition being "the current position having reached the point where the application icon is placed."

In some embodiments, specification of the start condition may be made on the setting screen of the navigation system. For example, the items that may be specified may be predefined (preloaded) by the system, included in the app, or obtained via the Internet. Also, the setting may be modified at the time of placing the icons of the application or may be subsequently modified.

In some embodiments, the application automatic start setting processing unit stores the start condition that has been input (along with the above-described placement condition) in the automatic start setting database. The application automatic start setting processing unit periodically processes the start condition in this database and, upon detection of the fact that the start condition has been satisfied, issues a request to start the application (e.g., the application is started by the application execution processing unit).

In some embodiments, a start condition may include a condition that is specified by a user/driver, a condition that has been preloaded into the navigation system, and a condition included in the application. For example, a start condition included in the application may be provided by a file describing the start condition, which comes with a package of the application (e.g., included in a jar file of the app) or is available at an application store to be accessible from an application management unit. In some embodiments, start conditions to be given priority such as safety standards, etc. (e.g., traffic/travel regulations), if any, may be preloaded. Start conditions may also be obtained from services on the Internet to be performed via the web start condition determination proxy unit.

Figure 8:
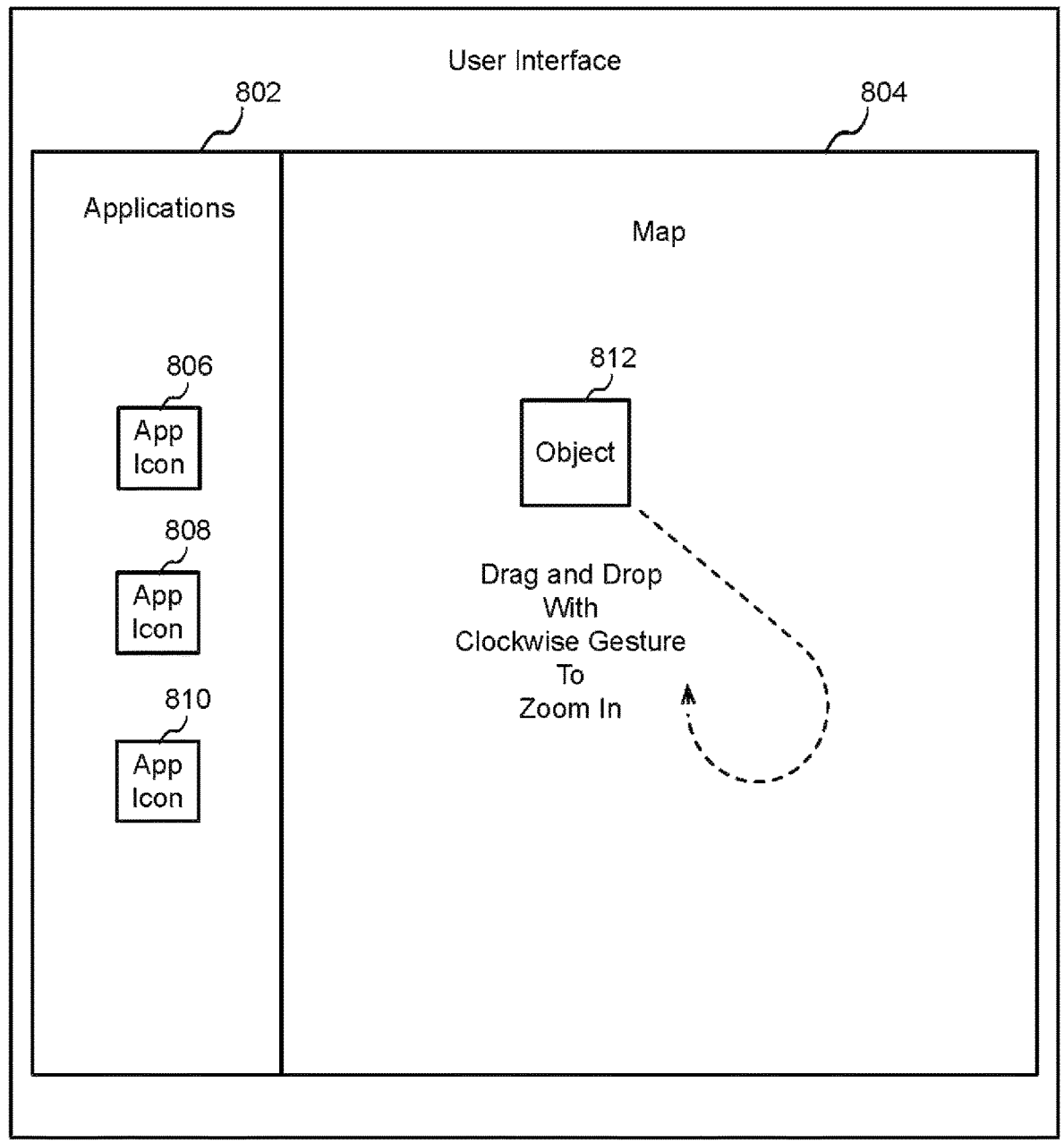
FIG. 8 illustrates an example user interface for dragging and dropping an object while zooming in or zooming out, according to some embodiments.

FIG. 8 illustrates an example user interface 800 for dragging and dropping an object while zooming in or zooming out, according to some embodiments. In various embodiments, the system enables the user to zoom in or zoom out with respect to the map based on a dragging gesture of an object. As shown, the user interface is displayed on a display screen (or navigation screen) that is a touch screen of a navigation system. Shown are an applications region 802 and a map 804. Applications region 802 show available applications that have been installed, where each application is represented by respective application icons 806, 808, and 810 (each labeled "App Icon").

Also shown is an object 812 that the user is dragging in map 804 to drop in a particular location in map 804. The object may be an application icon or any object. In some embodiments, the system enables the user to zoom into a portion of the map by making a clockwise gesture while dragging object 812 (as indicated with the dotted lines). Conversely, the system enables the user to zoom out of a portion of the map by making a counter-clockwise gesture while dragging object 812 (not shown). After the user has zoomed in or zoomed out to a desired view, the user may then drop the icon at a target position in the map.

The particular gesture may vary, depending on the particular implementation. For example, some embodiments, the system may enable the user to zoom into a portion of the map by making a counter-clockwise gesture while dragging object 812 (not shown). Conversely, the system may enable the user to zoom into a portion of the map by making a clockwise gesture while dragging object 812 (not shown).

FIG. 9 is a block diagram of an example environment 900 for configuring an application for automatic launching, which may be used for some implementations described herein. Shown is a vehicle 902, which includes an on-board device 904. On-board device 904 includes an application management unit 906 and a navigation system 908. On-board device 904 may receive user/driver input 910 and/or input from sensors 912. Sensors 912 may include interior and/or exterior sensors. On-board device 904 may also communicate with a cloud application server 914 and/or a cloud application store 916.

In various embodiments, on-board device 904 may be applied to or operated in cooperation with devices with application execution features and navigation features. Such devices may include smartphones and related systems, as well as various automotive navigation systems.

As indicated above, in some embodiments, application management unit 906 may include various sub-units such as an application execution processing unit for executing an application, an application icon display unit for displaying application icons, an application placement range providing unit for providing a placement range, an application automatic start setting unit for configuring an application for automatic launching, an application automatic start processing unit for automatically launching an application, and a navigation search proxy unit for various navigation functions. Application management unit 906 may also include various databases such as an application database, an automatic start setting database, etc.

With regard to navigation, in some embodiments, while the specific response returned at the time of searching by the navigation system depends on the navigation system as such, the response will include at least one piece of data indicative of a point on the map. The navigation search proxy unit conducts the search, extracts the data of the point out of the response, and converts it into data of the range definition. The placement range providing unit issues a request for search to the navigation search proxy unit and receives a result of it.

In some embodiments, navigation system 908 includes a map screen control unit for rendering maps and map elements in a display screen, and includes a route management unit for managing routes to be displayed in the display screen.

In operation, application management unit 906 sends map displays requests, placement ranges, route neighborhood conditions, application icon information, etc. to navigation system 908. Also, navigation system 908 sends placement information, navigation and vehicle information, etc. to application management unit 906.

User/driver input 910 may be processed by on-board device 904 in conjunction with touch/drag input operations, haptic device inputs, etc. Sensors 912 collect and provide data associated with position, direction of travel, vehicle speed, environment information, etc. Cloud application server 914 may include a web search proxy unit and a web start condition determination proxy unit.

With regard to searches, in some embodiments, while the specific response returned at the time of searching by the service on the Internet depends on the service as such, the response will include at least one piece of data indicative of a point on the map. The Web search proxy unit conducts the search, extracts the data of the point out of the response, and converts it into data of the range definition. The placement range providing unit issues a request for search to the web search proxy unit and receives a result of it. Because the web search proxy unit resides in the cloud, it will be easier to accommodate the emergence of new search services.

FIG. 10 is a block diagram of an example computer system 1000, which may be used for embodiments described herein. The computer system 1000 is operationally coupled to one or more processing units such as processor 1006, a memory 1001, and a bus 1009 that couples various system components, including the memory 1001 to the processor 1006. The bus 1009 represents one or more of any of several types of bus structure, including a memory bus or memory controller, a peripheral bus, an accelerated graphics port, and a processor or local bus using any of a variety of bus architectures. The memory 1001 may include computer readable media in the form of volatile memory, such as random access memory (RAM) 1002 or cache memory 1003, or storage 1004, which may include non-volatile storage media or other types of memory. The memory 1001 may include at least one program product having a set of at least one program code module such as program code 1005 that are configured to carry out the functions of embodiment of the present invention when executed by the processor 1006. The computer system 1000 may also communicate with a display 1010 or one or more other external devices 1011 via input/output (I/O) interfaces 1007. The computer system 1000 may communicate with one or more networks via network adapter 1008.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   at least one processor and a computer readable storage medium having program instructions embodied therewith, the program instructions executable by the at least one processor to cause the at least one processor to perform operations comprising:
   displaying on a display screen at least one application icon and a map;
   receiving from a user a selection of the at least one application icon;
   determining a route on the map, wherein the route has a starting point and a destination point;
   determining a placement constraint condition based on at least one application associated with the least one application icon and based on a predetermined distance from the route, wherein the placement constraint condition defines a placement region, and wherein the placement region comprises the route and an area on the map that is within the predetermined distance from the route;
   determining the placement region on the map to which the user can drag and drop the at least one application icon, wherein the determining of the placement region is based on the placement constraint condition;
   displaying the placement region to the user as the user drags the at least one application icon onto the map;
   enabling the user to drop the at least one application icon when the at least one application icon is over the placement region; and
   starting an application associated with the at least one application icon in response to the at least one application icon being dropped over the placement region and in response to a start condition being satisfied.

2. The system of claim 1, wherein the at least one processor further performs operations comprising:
   determining locations of one or more map icons, wherein the one or more map icons correspond to one or more respective intermediate stops along the route that are within the predetermined distance from the route; and
   displaying the one or more map icons in the placement region.

3. The system of claim 1, wherein the at least one processor further performs operations comprising constraining the user in dropping the at least one application icon within the placement region.

4. The system of claim 1, wherein, to indicate the placement region, the at least one processor further performs operations comprising highlighting one or more elements on the map.

5. The system of claim 1, wherein, to indicate the placement region, the at least one processor further performs operations comprising:
   generating one or more map elements on the map; and
   displaying the one or more map elements on the map, wherein the one or more map elements are positioned in the placement region.

6. The system of claim 1, wherein, to indicate the placement region, the at least one processor further performs operations comprising providing force feedback to the user.

7. The system of claim 1, wherein the at least one processor further performs operations comprising enabling the user to zoom in or zoom out with respect to the map based on a dragging gesture of an object.

8. A computer program product comprising a non-transitory computer readable storage medium having program instructions embodied therewith, the program instructions executable by at least one processor to cause the at least one processor to perform operations comprising:

displaying on a display screen at least one application icon and a map;

receiving from a user a selection of the at least one application icon;

determining a route on the map, wherein the route has a starting point and a destination point;

determining a placement constraint condition based on at least one application associated with the least one application icon and based on a predetermined distance from the route, wherein the placement constraint condition defines a placement region, and wherein the placement region comprises the route and an area on the map that is within the predetermined distance from the route;

determining the placement region on the map to which the user can drag and drop the at least one application icon, wherein the determining of the placement region is based on the placement constraint condition;

displaying the placement region to the user as the user drags the at least one application icon onto the map;

enabling the user to drop the at least one application icon when the at least one application icon is over the placement region; and starting an application associated with the at least one application icon in response to the at least one application icon being dropped over the placement region and in response to a start condition being satisfied.

9. The computer program product of claim 8, wherein the at least one processor further performs operations comprising:

determining locations of one or more map icons, wherein the one or more map icons correspond to one or more respective intermediate stops along the route that are within the predetermined distance from the route; and displaying the one or more map icons in the placement region.

10. The computer program product of claim 8, wherein the at least one processor further performs operations comprising constraining the user in dropping the at least one application icon within the placement region.

11. The computer program product of claim 8, wherein, to indicate the placement region, the at least one processor further performs operations comprising highlighting one or more elements on the map.

12. The computer program product of claim 8, wherein, to indicate the placement region, the at least one processor further performs operations comprising:

generating one or more map elements on the map; and displaying the one or more map elements on the map, wherein the one or more map elements are positioned in the placement region.

13. The computer program product of claim 8, wherein, to indicate the placement region, the at least one processor further performs operations comprising providing force feedback to the user.

14. The computer program product of claim 8, wherein the at least one processor further performs operations comprising enabling the user to zoom in or zoom out with respect to the map based on a dragging gesture of an object.

15. A computer-implemented method for configuring an application for launching, the method comprising:

displaying on a display screen at least one application icon and a map;

receiving from a user a selection of the at least one application icon;

determining a route on the map, wherein the route has a starting point and a destination point;

determining a placement constraint condition based on at least one application associated with the least one application icon and based on a predetermined distance from the route, wherein the placement constraint condition defines a placement region, and wherein the placement region comprises the route and an area on the map that is within the predetermined distance from the route;

determining the placement region on the map to which the user can drag and drop the at least one application icon, wherein the determining of the placement region is based on the placement constraint condition;

displaying the placement region to the user as the user drags the at least one application icon onto the map;

enabling the user to drop the at least one application icon when the at least one application icon is over the placement region; and starting an application associated with the at least one application icon in response to the at least one application icon being dropped over the placement region and in response to a start condition being satisfied.

16. The method of claim 15, further comprising:

determining locations of one or more map icons, wherein the one or more map icons correspond to one or more respective intermediate stops along the route that are within the predetermined distance from the route; and displaying the one or more map icons in the placement region.

17. The method of claim 15, further comprising constraining the user in dropping the at least one application icon within the placement region.

18. The method of claim 15, wherein the indicating of the placement region comprises highlighting one or more elements on the map.

19. The method of claim 15, wherein the indicating of the placement region comprises:

generating one or more map elements on the map; and displaying the one or more map elements on the map, wherein the one or more map elements are positioned in the placement region.

20. The method of claim 15, wherein the indicating of the placement region comprises providing force feedback to the user.

* * * * *